United States Patent [19]
Spitsbergen et al.

[11] 3,758,639
[45] Sept. 11, 1973

[54] STYRENE SOLUBLE CHEMICALLY RESISTANT POLYESTER

[75] Inventors: James C. Spitsbergen, Franklin Lakes; Young Kwon Kim, Paterson, both of N.J.

[73] Assignee: Witco Chemical Company, New York, N.Y.

[22] Filed: Aug. 11, 1971

[21] Appl. No.: 170,965

[52] U.S. Cl. ............................ 260/870, 260/75 S
[51] Int. Cl. ..................... C08f 21/02, C08g 17/10
[58] Field of Search ............... 260/870, 75 S, 47 C

[56] References Cited
UNITED STATES PATENTS

| | | | |
|---|---|---|---|
| 2,593,411 | 4/1952 | Caldwell | 260/75 |
| 2,726,177 | 12/1955 | Lew | 117/161 |
| 3,222,322 | 12/1965 | Nischk et al. | 260/75 |
| 3,214,491 | 10/1965 | Stanton | 260/871 |
| 3,538,187 | 11/1970 | Feltzin | 260/861 |

OTHER PUBLICATIONS

Chem. Abstracts 60, 14695e (1964)
Chem. Abstracts 71, 22563d (1969)

*Primary Examiner*—William H. Short
*Assistant Examiner*—E. A. Nielsen
*Attorney*—Sidney Wallenstein, Jordan J. Driks et al.

[57] ABSTRACT

Mixed bisphenol polyesters of the reaction product of 50–90 mol percent dialkoxylated bisphenol S (dihydroxydiphenyl sulfone), 10–50 mol percent dialkoxylated bisphenol A (isopropylidene bisphenol) and an alpha-unsaturated dicarboxylic acid, may be copolymerized with an aromatic vinyl monomer such as styrene to yield thermoset products having improved heat deformation properties (heat distortion temperatures) and solvent resistance.

6 Claims, No Drawings

STYRENE SOLUBLE CHEMICALLY RESISTANT POLYESTER

This invention relates to novel mixed bisphenol polyester reaction products of a mixture of dialkoxylated bisphenol S and dialkoxylated bisphenol A with an alpha unsaturated dicarboxylic acid. The novel mixed bisphenol polyesters are compatible with vinyl type monomers, particularly aromatic vinyl monomers such as styrene. They may be copolymerized therewith to produce novel thermoset products as hereinafter described.

Polyesters of dialkoxylated bisphenols and alpha-unsaturated dicarboxylic acids such as fumaric acid, itaconic acid, maleic acid, citraconic acid and the like, are known and are usually prepared by reaction of a dialkoxylated bisphenol with the respective acid or anhydride. The polyesters of dialkoxylated bisphenol A are known to readily copolymerize with a vinyl type monomer such as styrene to render thermoset resins. However, polyesters prepared using dialkoxylated bisphenol S and an alpha-unsaturated dicarboxylic acid are incompatible with monomers such as styrene at the monomer content desired for solution in the preparation of thermoset resins. Even physical blends of dialkoxylated bisphenol S polyesters with dialkoxylated bisphenol A polyesters are not compatible with vinyl monomers such as styrene at the 30–50 percent styrene content level desired for solution and the corresponding thermoset resins therefore have been heretofore unavailable.

The polyesters of the present invention are comprised of both bisphenol A and bisphenol S and are made by standard esterification techniques such as disclosed in U.S. Pat. No. 2,634,251, issued Apr. 7, 1953 to Kass, with is incorporated herein by reference. Generally the procedure involves reacting an alpha-unsaturated dicarboxylic acid, preferably fumaric acid, with a mixture of dialkoxylated bisphenol S and dialkoxylated bisphenol A, preferably in the presence of an inhibitor such as hydroquinone, at a temperature from about 185°C. to about 220°C. for at least about four to eight hours.

The bisphenol S, from which the dialkoxylated bisphenol S is prepared, is commercially available as a mixture of 2,4'- and 4,4'-isomer, wherein the 2,4'-isomer is present in concentrations of up to about 20 percent. This invention includes the 4,4'-bisphenol S and isomeric mixtures thereof. It is preferred that the bisphenols be substantially dialkoxylated, i.e. prepared using a molar ratio of alkylene oxide to bisphenol of substantially 2:1; although alkoxylated bisphenol S having molar ratios of up to 3:1, respectively, may be utilized, they lead to a lessening of improvements in mechanical properties of the resultant thermoset and therefore are not preferred.

The concentration of dialkoxylated bisphenol A in the above mixed polyester may be between 10 and 50 mol percent and preferably between 20 and 40 mol percent based upon the dialkoxylated bisphenol S concentration for best results.

Methods for making both the dialkoxylated bisphenol A and the dialkoxylated bisphenol S are well known in the art and are not the subject of the present invention. The dialkoxylated mixed bisphenols from which the present polyesters are prepared may be, for instance, diethoxylated, dipropoxylated, dibutoxylated, and the like, but because the dipropoxylated mixed bisphenol polyester is well balanced in monomer compatibility, particularly with styrene, and resin formation, it is preferred.

Thermosets of the mixed bisphenol polyesters of the present invention are generally prepared by casting a solution of the mixed bisphenol polyester in a monomer such as styrene at concentrations in the range of 30–60 percent and preferably 40–50 percent, containing 1.5 phr methyl ethyl ketone peroxide and 0.5 phr cobalt naphthenate or manganese octoate, for instance, in a suitable mold. A rigid thermoset is obtained after about 16 hours. Crosslinking can further be increased by heating at about 100°C. for several hours, as known in the art.

The thermoset resins prepared from the mixed bisphenol polyesters of the present invention, as hereinafter described, have improved solvent resistance, better flexural strength and improved heat deformation properties as compared with corresponding thermosets prepared from dialkoxylated bisphenol A.

The present invention is illustrated by the following examples describing the preparation of specific polyesters and polymers of the invention and is not intended to be limited thereto.

EXAMPLE 1

The following ingredients are charged into a resin flask equipped with an automatic stirrer, a Dean-Stark trap, a condenser, and a source of nitrogen.

Dipropoxylated bisphenol S (having
substantially 2 to 1 mol ratio of
propylene oxide to bisphenol S)
1500 grams     (4.1 moles)
Dipropoxylated bisphenol A (having
substantially a 2 to 1 mol ratio of
propylene oxide to bisphenol A),
500 grams     (1.45 moles)
Fumaric acid 650 grams     (5.6 moles)
Hydroquinone 2.45 grams The reaction mixture is heated to 100°C. where a molten slurry results and stirring is initiated. The temperature is then raised to about 185° to 195°C. and maintained at that temperature range for about 2 ¼ hours. The temperature is then raised to about 215° to 220°C. and maintained there for about 2 ½ hours. After this time about 80 percent of the theoretical water of reaction is collected. The reaction mixture is then heated at reduced pressure of 15 mm. mercury for an additional two hours. About 90 percent of the theoretical water of reaction is collected. The hot molten product is cooled. It has an acid number of about 23.

EXAMPLE 2

The procedure of Example 1 is followed using 2,000 grams of dipropoxylated bisphenol S and the same concentration of dipropoxylated bisphenol A. The product has an acid number of 19.1.

The following Table 1 illustrates the hardening properties of resins prepared by the copolymerization of the fumaric acid esters of dipropoxylated bisphenol A and those from mixed dipropoxylated bisphenol S and dipropoxylated bisphenol A, in 40 percent styrene, made by mixing the ingredients in a one liter resin kettle with cooling, and adding a 6 percent solution of manganese octoate at 0.5 phr to the solution, then degassing under 35 mm presure for 15 minutes. Subsequently, 2 phr of a 60 percent solution of methylethyl ketone peroxide in dimethyl phthalate is mixed in the flask and thereafter the reaction mixture is poured into glass molds and clamped. The polymer blend is allowed to set at ambient temperatures for about 16–18 hours and then subjected to 100°C. temperature for about four hours. Samples are then removed for testing. The results are shown in the following Table I wherein the mol proportions of each dipropoxylated bisphenol in the polyester are as indicated.

In addition, Table I shows the improved heat distortion temperatures of the mixed bisphenol polyester thermosets of the present invention, wherein the heat distortion temperature is shown to increase as the bisphenol S content of the thermoset is increased,

TABLE I

Resins Properties

|  | *A only | 50% A & 50% S | 30% A & 70% S | 20% A & 80% S |
|---|---|---|---|---|
| Acid No. | 17.1 | 29 | 20 | 18.9 |
| Durrans Softening Point (°C) | 111 | 116 | 132 | 154 |
| Heat Distortion Temperature | 122 | 125 | 128 | 135 |

*A and S representing dipropoxylated bisphenol A and dipropoxylated bisphenol S, respectively The mixed bisphenol dipropoxy fumaric acid polyester imparts increased rigidity to the thermoset when copolymerized with styrene, for instance, as measured by the increased flexural modulus, and heat aging resistance, as indicated by the low weight loss after 24 hours at 260°C., when the 80 percent dipropoxylated bisphenol S/20 percent dipropoxylated bisphenol A polyester thermoset is compared with the corresponding polyester thermoset prepared from dipropoxylated bisphenol A as shown in Table II. An increase in nonpolar solvent resistance is also indicated by the high retention of rigidity after immersion in toluene of the mixed bisphenol polyester thermoset resin.

TABLE II

Properties of Thermoset Bisphenol S Fumaric Acid Polyester Resin copolymer with 40% styrene:

|  | *A only | 20% A & 80% S |
|---|---|---|
| Flexural strength, psi (ASTM D-790) | 11,900 | 10,700 |
| Flexural modulus, psi (ASTM D-790) | 413,000 | 453,000 |
| HDT, °C (ASTM D-648) | 122 | 135 |
| Barcol hardness | 23 | 29 |
| Weight loss after 24 hours at 260°C., % | 7.5 | 6.4 |
| Flexural modulus retained after 18 hours at 90°C. in toluene, % | 68 | 86 |

*A and S representing dipropoxylated bisphenol A and dipropoxylated bisphenol S respectively

Having thus described our invention, we claim:

1. A mixed bisphenol A-bisphenol S polyester comprising the esterification product of an alpha unsaturated dicarboxylic acid or anhydride thereof, and a substantially dialkoxylated mixed bisphenol reaction product comprising 50–90 mol percent of substantially dialkoxylated bisphenol S and 10–50 mol percent of substantially dialkoxylated bisphenol A.

2. A mixed polyester as in claim 1 comprising 70–80 mol percent of substantially dipropoxylated bisphenol S and 20–30 mol percent of dipropoxylated bisphenol A.

3. A mixed polyester as in claim 1 wherein the alpha unsaturated dicarboxylic acid is fumaric acid.

4. A mixed polyester as in claim 2 wherein the alpha unsaturated dicarboxylic acid is fumaric acid.

5. The thermoset product of the mixed polyester of claim 1 and a vinyl monomer.

6. The thermoset product of claim 5 wherein the vinyl monomer is styrene.

* * * * *